B. FORD.
VEHICLE SUSPENSION.
APPLICATION FILED OCT. 21, 1911.
1,205,612.
Patented Nov. 21, 1916.
2 SHEETS—SHEET 1.
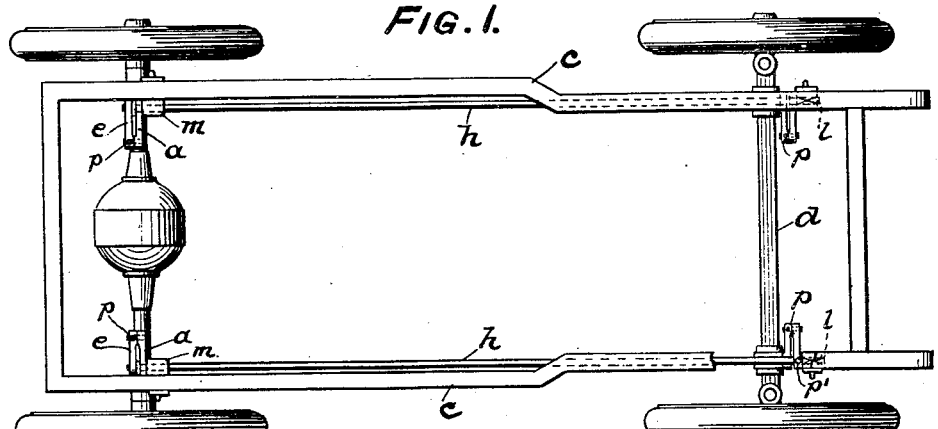
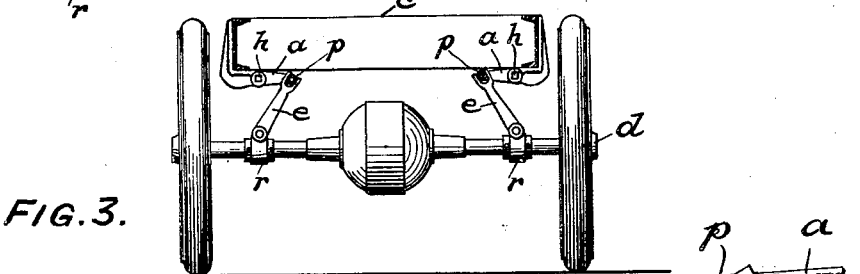
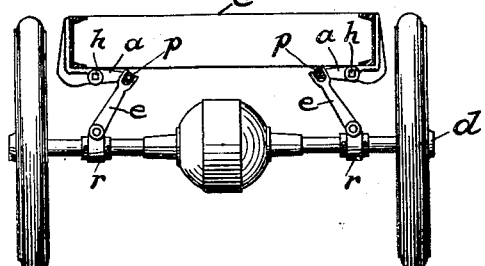
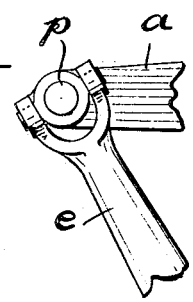
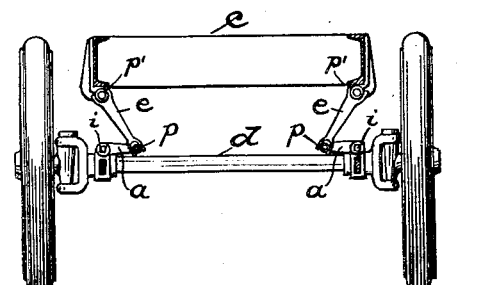
WITNESSES:
INVENTOR
Bruce Ford
BY
Augustus B. Stoughton.
ATTORNEY.

B. FORD.
VEHICLE SUSPENSION.
APPLICATION FILED OCT. 21, 1911.
1,205,612.
Patented Nov. 21, 1916.
2 SHEETS—SHEET 2.
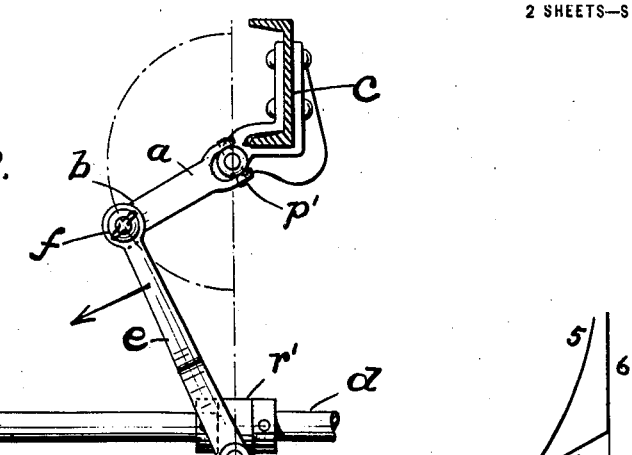
FIG. 8.
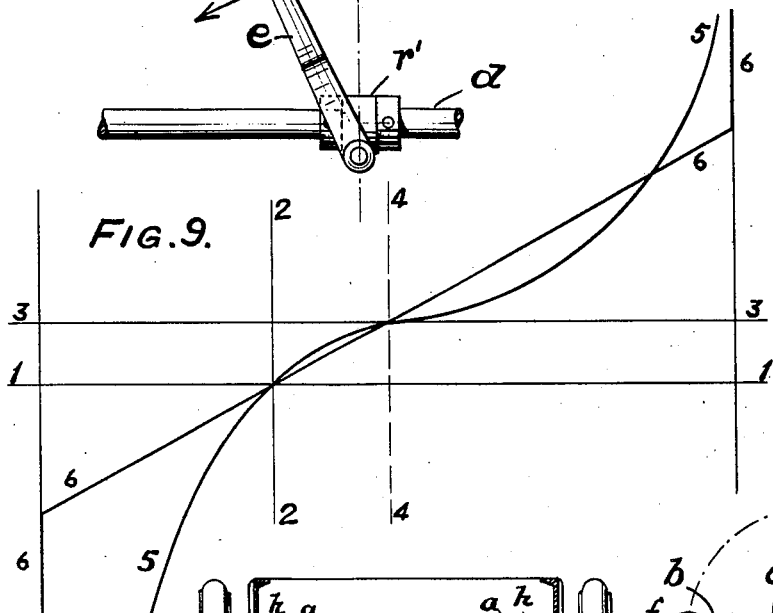
FIG. 9.
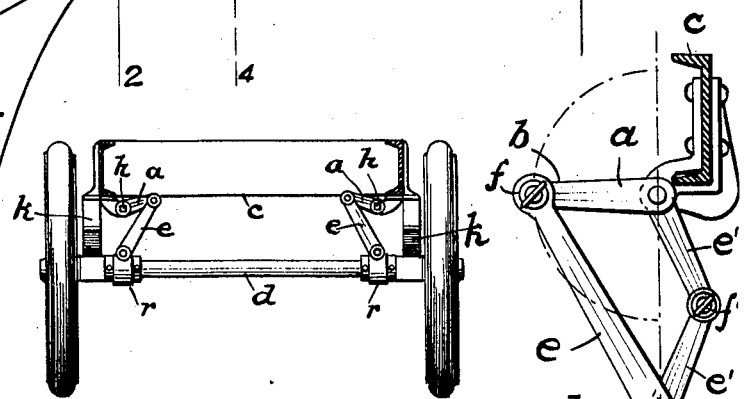
FIG. 6.
FIG. 7.
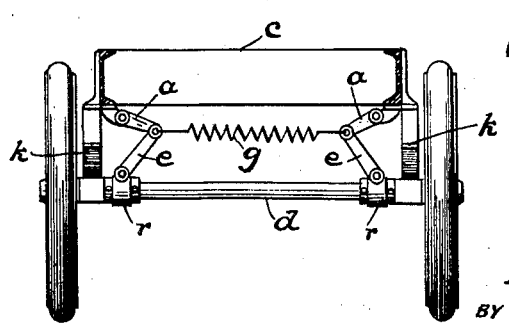
FIG. 10.
WITNESSES:
Rob R Kitchel
Funk & French
INVENTOR
Bruce Ford
BY
Augustus B. Stoughton
ATTORNEY.

UNITED STATES PATENT OFFICE.

BRUCE FORD, OF PHILADELPHIA, PENNSYLVANIA.

VEHICLE SUSPENSION.

1,205,612.	Specification of Letters Patent.	Patented Nov. 21, 1916.

Application filed October 21, 1911. Serial No. 655,987.

*To all whom it may concern:*

Be it known that I, BRUCE FORD, a citizen of the United States, residing at the city of Philadelphia, in the county of Philadelphia and State of Pennsylvania, have invented a certain new and useful Vehicle Suspension, of which the following is a specification.

The principal objects of the present invention are to provide a vehicle suspension offering little resistance to movements of small amplitude of the road member in respect to the body member and offering gradually increasing resistance to movements of greater amplitude; and to provide a vehicle suspension which shall take up shocks and jars in both directions, that is, upward and downward and shall be properly resilient under normal conditions.

The invention will be claimed at the end hereof but will first be described in connection with the embodiments chosen from other embodiments of it for illustration in the accompanying drawings in which—

Figure 1, is a top or plan view of so much of a vehicle as is necessary for illustrating my invention in application thereto. Fig. 2, is a side view of parts of the structure shown in Fig. 1. Figs. 3 and 4, are views respectively of the left and right hand ends of the structure shown in Fig. 1. Fig. 5, is a view illustrating a detail of construction. Fig. 6, is an end view illustrating a modification. Fig. 7, is a similar view illustrating another modification. Fig. 8, is a detail view drawn to an enlarged scale and showing the addition of a frictional device. Fig. 9, is a diagrammatic view hereinafter referred to, and Fig. 10, is a view illustrating a modification.

A flexible suspension of the invention includes a pivotal lever $a$, Fig. 8, the free end $b$, of which is adapted to receive alternate forces acting in substantially opposite directions in a path angular to the lever and tending to turn it in both directions into alinement with the path of the forces, and a uniformly increasing spring resistance opposing the alinement of the lever with the direction of the path of the forces. The forces referred to are those due to the weight of the body member upon the road member and also those developed by the passage of the vehicle over inequalities in the road and the latter of course act in opposite directions tending to shift the road member $d$, and body member $c$, toward and away from each other. The path in which these forces act is substantially vertical and the lever $a$, is accordingly disposed angularly in respect to the vertical and, generally speaking the lever $a$, is disposed under normal load conditions approximately horizontal or somewhere nearly at right angles to the direction of the force upon it under normal load condition. The lever $a$, swings in both directions from its normal load position, as indicated by the dotted line in Fig. 8. The link $e$, with its connections to the lever $a$ and to the road member $d$, comprise means for applying forces as described to the free end of the lever $a$, which is pivoted to the body member $c$, and the link $e$, is longer than the lever $a$, so that the latter may turn in both directions. The tendency is for the link $e$, and lever $a$, to approach alinement with each other, the free end $b$, moving upward or downward in respect to the fulcrum of the lever $a$, according as the vertical force is applied to the body member in a downward or an upward direction. A spring resistance acting in the direction shown by the arrow in Fig. 8 constantly and increasingly opposes alinement of the lever $a$ with the direction of forces in both directions. As the lever approaches alinement with the direction of the forces in both directions, the spring resistance becomes constantly increased and at the same time the leverage with which the forces act upon the spring resistance becomes constantly decreased by the well known mode of operation of a toggle joint. The sleeve $r^1$ turnable upon the axle of the road member $d$, and the swivel joint $p^1$, allow certain end play of the parts without binding of the joints.

As shown in Figs. 1–5, $h$ and $i$, are torsion springs after the manner shown and described in my application for Letters Patent filed October 21st, 1911, serially numbered 655,988. These torsion springs and their coöperating links and levers constitute the sole means of spring support and serve to oppose and limit shocks both upward and downward while as shown in Fig. 6, the torsion rods are supplementary to the springs $k$, of ordinary construction, the latter being of use in maintaining the alinement of the axle in the ordinary way. This construction is adapted to limit shocks either upward only or downward only or both upward and downward, depending upon the setting of the torsion spring.

As shown in Figs. 1-5, one end of the torsion rod $h$, is connected with the body member $c$, as at 1, fitting snugly into a squared hole or by other means to prevent turning, although it may be allowed some end play, and the other end is turnable that is, journally mounted, in a guide $m$, on the body member and is connected with the lever $a$. One end of the torsion rod $i$, is connected with the road member as at $n$, in a manner to prevent it turning, and the other end of this rod is turnably connected with the road member as at $o$. The ends of the levers and links are connected by universal joints $p$, which coöperating with the sleeve $r$ turnable on the axle, and swivel joints $p^1$, allow of a certain relative fore and aft motion of body and road members, without binding of the various joints. Alinement of the axles may be maintained in any well known manner, such as for example, the radius rods $s$, placed at any suitable position. The normal condition of the torsion rods is such that they come under torsional stress when the lever $a$, is turned either up or down in respect to their no-load position.

Referring to Fig. 9, horizontal direction indicates deflection and vertical direction indicates load on the springs. The line 1—1, indicates zero load and the line 2—2 indicates zero deflection. The line 3—3, indicates normal load which may be said to be in positive direction in respect to line 1—1, and the line 4—4, indicates normal deflection of springs under normal load which may be called positive deflection in respect to the line 2—2. Deflections to the right of 2—2, may be said to be positive and those to the left of 2—2, negative, just as loads above 1—1, may be said to be positive and those below 1—1 may be said to be negative. The curved line 5—5, indicates the action of the described suspension while line 6—6, indicates the action of ordinary springs. Evidently at or about normal load and normal deflection the curves in the line 5—5, on either side are comparatively flat which means that under ordinary conditions the suspension is flexible and resilient. Upon increase of load the resistance of the suspension is ever increasing and at an increasing rate, approaching the infinite as is shown by the end portions of the line 5—5. An examination of the line 6—6, shows an entirely different action and the points where the ends of the line 6—6, run into the verticals indicate that the bumpers or the hold-down straps have come into action, whereas in the improved suspension the springs are still operating and are opposing rapidly increasing resistance to deflection. The tension spring $g$, Fig. 7, and the torsion springs of the other figures, increasingly oppose the alinement of the lever with the link in the direction of the path of the forces, that is, vertically, by reason of the increasing resistance of the spring and by reason of the changing leverage or toggle joint action. The device will act as a bumper and as a hold-down in each extreme position respectively.

Friction provisions may be applied at any of the working joints, such for example as at $f$, Figs. 8 and 10. In Fig. 10 is shown a duplication of the arrangement described in connection with the other figures and the parts $e$ and $a$ operate in one direction and the parts $e^1$ operate in the other direction.

The body member may hang from the road member, as is the case in some motor vehicle construction, where the body frames are placed below the axles and the invention is obviously adaptable to such construction. Radius rods or other devices may be used in connection with this invention for limiting side or end motion as desired. Springs or friction devices may be used at any of the moving parts instead of the particular position chosen for illustration.

Although the forces which cause the road and body members of the vehicles to move toward and away from each other are described as vertical, the forces acting upon the lever $a$, through the link $e$, will be only substantially vertical, being somewhat angular depending on the length of the link in relation to that of the lever, and the vertical alinement of the link with the fulcrum of the lever; the forces acting upon the lever will remain vertical only if the link $e$ is of infinite length.

What I claim is:

In a vehicle comprising a road member and a body member movable toward and away from each other in response to forces acting in opposite directions, the combination of a toggle-joint intermediate of and connecting said members and comprising a pivotally connected lever and link pivotally connected respectively with the body and road members and whereof one is longer than the other to permit the lever to swing out of normal position in two directions into alinement with the direction of said forces, and a spring acting directly on the toggle-joint for opposition in two directions and adapted to exert a constantly increasing opposition to alinement of the link and lever with the direction of forces in both directions and to restore them to normal position.

In testimony whereof I have hereunto signed my name.

BRUCE FORD.

Witnesses:
S. H. FLANDERS,
GEO. M. HOWARD.